June 6, 1967

D. D. BOCK ETAL 3,324,381

RESET SYSTEMS FOR ENERGY STORING TRANSFORMERS IN CONTROLLED
RECTIFIER INVERTER CIRCUITS

Filed Dec. 13, 1963

INVENTORS
DONALD D. BOCK
DAVID COOPER
BY
THEIR ATTORNEY

June 6, 1967     D. D. BOCK ET AL     3,324,381
RESET SYSTEMS FOR ENERGY STORING TRANSFORMERS IN CONTROLLED
RECTIFIER INVERTER CIRCUITS Filed Dec. 13, 1963     4 Sheets-Sheet 4

FIG.5

INVENTORS
DONALD D. BOCK
DAVID COOPER
BY
THEIR ATTORNEY

United States Patent Office 3,324,381
Patented June 6, 1967

3,324,381
RESET SYSTEMS FOR ENERGY STORING TRANS-
FORMERS IN CONTROLLED RECTIFIER IN-
VERTER CIRCUITS
Donald D. Bock and David Cooper, Erie, Pa., assignors to
General Electric Company, a corporation of New York
Filed Dec. 13, 1963, Ser. No. 330,346
6 Claims. (Cl. 321—35)

This invention relates to controlled rectifier inverter circuits wherein a direct current input voltage may be converted to an alternating current output voltage or, by rectifying the output voltage, to a desired different direct current voltage.

A widely used controlled rectifier circuit for providing the foregoing is known as the parallel inverter, different arrangements of which are described in the "Silicon Controlled Rectifier Manual," second edition, published in 1961, by the General Electric Company. Briefly, such parallel inverters generally employ a suitable transformer and a pair of controlled rectifiers arranged so that when one controlled rectifier is rendered conductive the other is suitably reverse biased for a sufficient period of time to allow it to recover to its blocking state. While such parallel inverter circuits are quite satisfactory for many applications, they require additional circuit means for minimizing the power loses in the controlled rectifier commutation circuitry as well as special starting circuitry to prevent miscommutation of the controlled rectifiers. Moreover, such prior art controlled rectifier inverter circuits are not entirely satisfactory for operation under a wide range of loads and load power factors. Further, since the controlled rectifier inverter circuit output transformer cannot be allowed to saturate, it is also necessary to maintain a stable, predetermined, driving frequency for the controlled rectifier firing circuits in order to insure proper charging of the commutation capacitor and limit the volt-seconds applied to the transformer below its saturation level.

It is an object of this invention, therefore, to provide a controlled rectifier inverter circuit which substantially overcomes one or more of the prior art disadvantages.

It is another object of this invention to provide a new, improved and simplified controlled rectifier inverter circuit particularly suitable for driving reactive loads.

It is still another object of this invention to provide a controlled rectifier inverter circuit wherein the period of oscillation of the relaxation oscillator type firing circuit associated therewith may be substantially different from that of the inverter circuit.

Briefly stated, in accordance with one aspect of this invention, the inverter circuit comprises a solid-state controlled rectifier having an anode, a cathode and a control electrode. An isolating energy storing transformer is provided having a primary winding, a reset winding and at least one secondary output winding for supplying power to a load. The primary winding of the transformer is connected in series with the anode-cathode elements of the controlled rectifier to a source of unidirectional voltage. First and second control circuit means are provided for respectively rendering the controlled rectifier conducting by application of a gating signal to the control electrode and nonconducting by application of a reverse bias a predetermined time thereafter. Means are further provided for establishing an electrical path including the transformer reset winding operative to clamp the transformer voltage to that of the source and allow the transformer to reset to a low residual flux level. Interlocking circuit means are also provided to prevent the application of a gating signal to the control electrode of the controlled rectifier until the flux in the transformer has reset to a predetermined residual level.

The novel features believed characteristic of our invention are set forth with particularity in the appended claims. The invention itself, however, both as to its organization and mode of operation, together with further objects and advantages thereof, may best be understood by reference to the following description taken in conjunction with the accompanying drawing in which:

Figure 3:
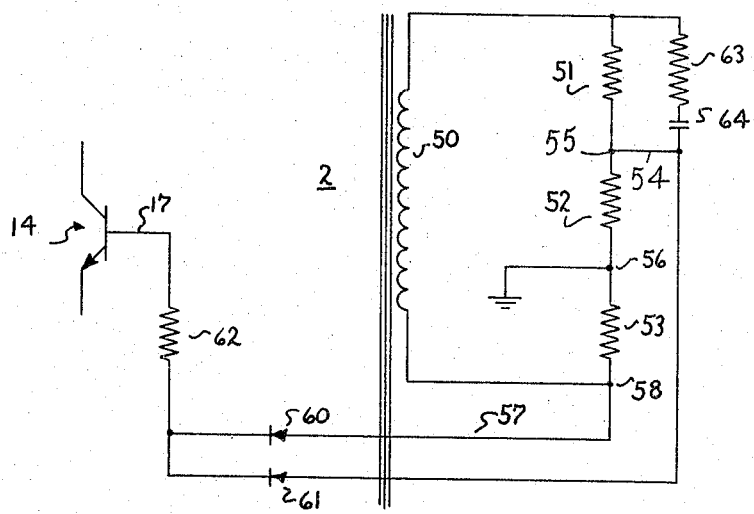
FIG. 3 is a schematic circuit diagram of an alternative interlocking arrangement to prevent application of a gating signal to the controlled rectifier until the output transformer has reset.
Figure 4:
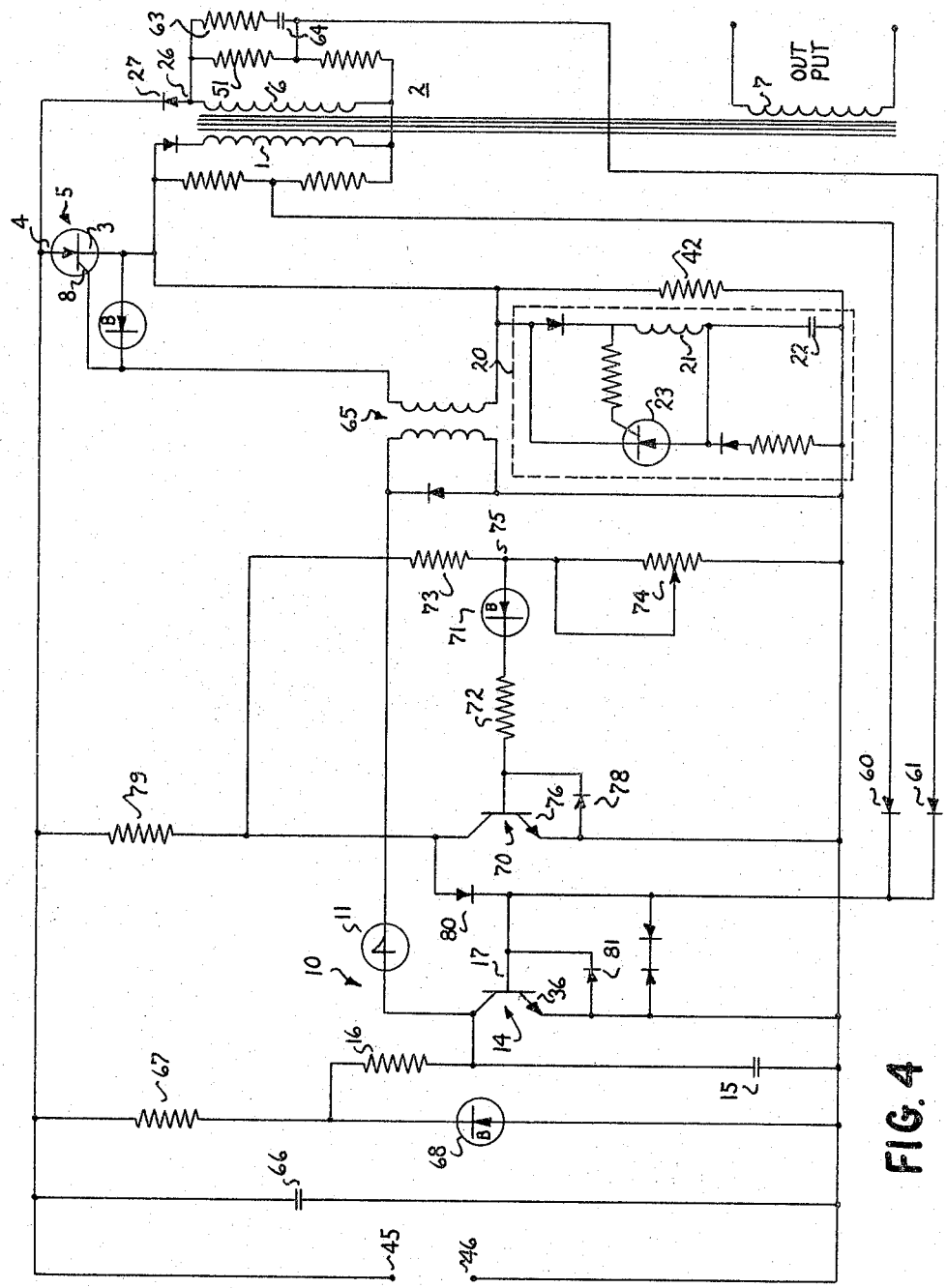

FIG. 4 is a schematic circuit diagram of a complete inverter circuit in accordance with this invention and incorporating a line voltage interlocking arrangement and the load voltage interlock arrangement of FIG. 3; and FIG. 5 is a schematic circuit diagram in block diagram form illustrating an arrangement whereby the inverter circuit supplies power to both a direct current and an alternating current load.

Figure 1:
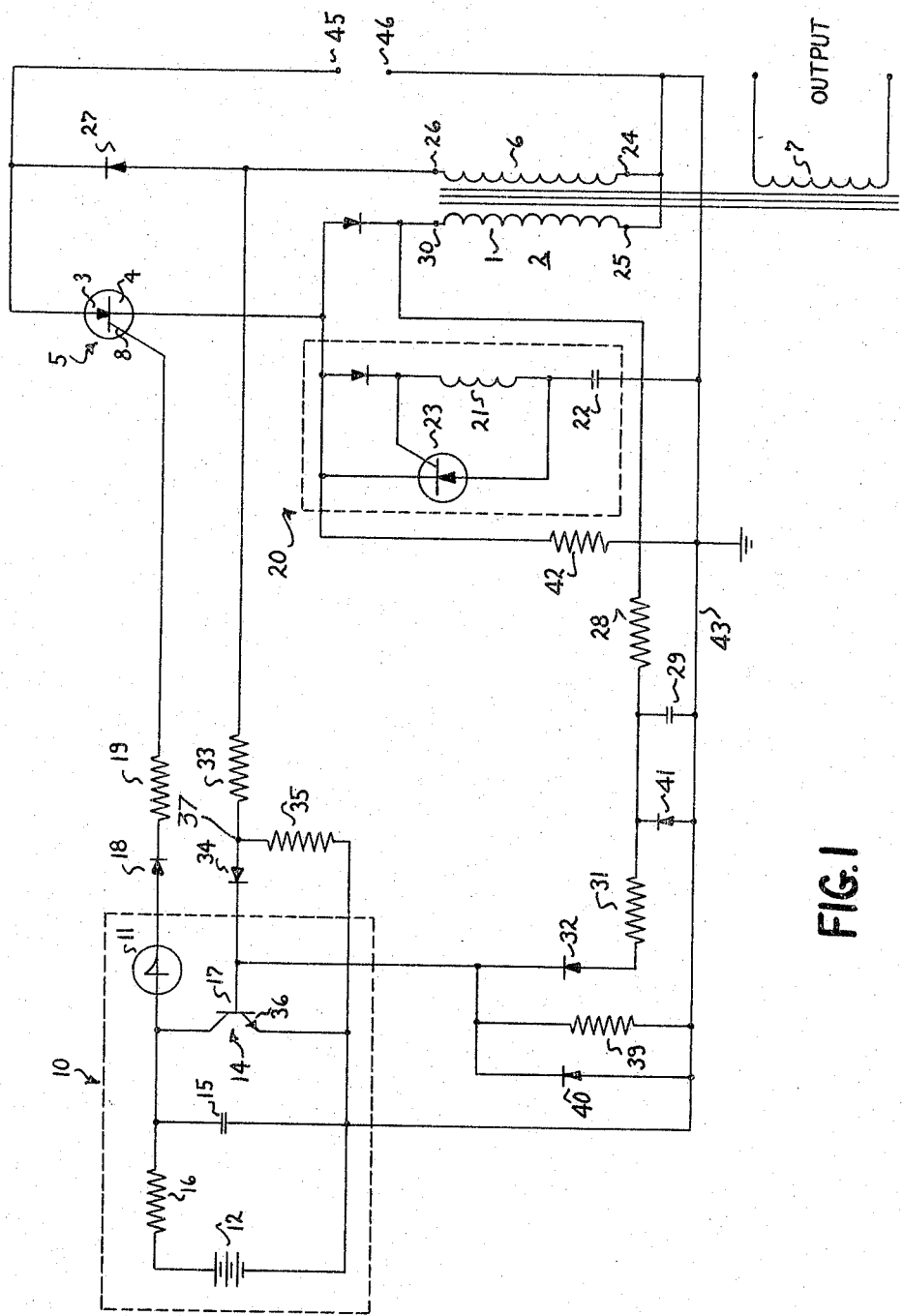
FIG. 1 is a schematic circuit diagram of a basic controlled rectifier inverter circuit in accordance with this invention.

FIG. 1 shows a schematic circuit diagram of a basic controlled rectifier inverter circuit in accordance with an embodiment of this invention. Power from a source of direct current is applied in series with the primary winding 1 of an isolating, energy storing transformer, generally designated at 2, and the anode 3 and cathode 4 of a solid-state controlled rectifier 5. Isolating, energy storing transformer 2 includes a reset winding 6 and a secondary output winding 7 for supplying power from the direct current source to a load connected thereto. Transformer 2 may be an air gapped transformer, a permanent magnet-biased transformer or other suitable isolating energy storing transformer capable of resetting by utilization of its energy storage characteristics.

Controlled rectifier 5 is rendered conductive to energize primary winding 1 from the direct current power source when a suitable positive voltage is applied to its control electrode 8. This positive voltage may be provided by any suitable firing circuit and may be for example a variable frequency relaxation oscillator which produces output pulses operative, when applied to control electrode 8, to initiate conduction in controlled rectifier 5.

A suitable firing circuit of this type is indicated generally at 10 and includes a four layer-type semiconductor diode 11, a suitable voltage supply, shown schematically as battery 12, and a transistor 14 for controlling the period of oscillation. The period of oscillation is determined by the charging rate of capacitance 15 which in turn is essentially determined by the value of resistance 16 and the amount of current shunted by transistor 14. The amount of current shunted by transistor 14 is determined by the magnitude of the feedback signals appearing at the base electrode 17. The gating pulses produced by the foregoing firing circuit are applied, through a suitable rectifier device 18 and current limiting resistance 19, to control electrode 8 and are operative to initiate conduction in controlled rectifier 5 whenever the anode 3 is positive with respect to the cathode 4. Alternatively, the gating pulses may be applied to control electrode 8 through a suitable coupling transformer in a manner well known in the art.

Since controlled rectifier 5 is connected to a source of direct current, a commutation circuit means 20 must be provided to turn the controlled rectifier off. A wide variety of commutation, or turn-off, circuit means are known in the art, any of which may be employed with the inverter circuit of this invention. For example, a common method of turning off a controlled rectifier that is conducting from a direct current supply is to connect a charged capacitor across the controlled rectifier so that the cathode is driven positive with respect to the anode. Various suitable commutation circuits of this type are shown and described in the foregoing Silicon Controlled Rectifier Manual. In the arrangement illustrated in FIG. 1, for example, current is conducted in the forward direction in the commutation circuit 20 for a time determined by one half cycle of the series resonant circuit of inductance 21 and capacitance 22. After this time the current in the resonant circuit reverses causing controlled rectifier 23 to conduct and allowing the energy stored in capacitance 22 to discharge into primary winding 1. The discharge of capacitance 22 into primary winding 1 serves to apply a reverse bias to controlled rectifier 5 of approximately the same magnitude as that of the supply which causes it to become nonconducting. Accordingly, the time during which controlled rectifier 5 remains conducting after application of the gating signal from firing circuit 10 is determined by the characteristics of the commutation circuit 20.

In further accord with this invention an electrical path including the reset winding 6 is provided to clamp the the transformer voltage to that of the direct current voltage supply and also to allow the transformer to be reset to a desired low residual flux level by the energy stored in transformer 2. To this end terminal 24 of reset winding 6 is connected to terminal 25 of primary winding 1, which is connected to one side of the direct current voltage supply, and terminal 26 of reset winding 6 is connected through a suitable rectifier device 27 to the anode 3 which is connected to the other side of the direct current voltage supply.

Interlocking means are also provided to assure dependable commutation circuit operation and prevent controlled rectifier 5 from being rendered conductive until the flux in transformer 2 has been reset to the desired low residual flux level. For example, the capacitance 22 associated with the commutation circuit 20 must be allowed to charge to a value substantially in excess of the voltage of the direct current supply in order to assure dependable turn-off of the controlled rectifier. Failure of the controlled rectifier to be turned off as well as allowing it to become conductive before transformer 2 has reached its reset condition results in allowing transformer 2 to saturate and thereby prevent operation of the inverter circuit.

In the interlock arrangement illustrated in FIG. 1, the voltage of both primary winding 1 and reset winding 6 is sampled and feedback signals derived therefrom which are applied to the control electrode of transistor 14 to control its conduction and the operation of firing circuit 10. Thus, the interlock means is operative to prevent the application of a gating signal to the control electrode of the controlled rectifier as long as the flux is changing in transformer 2. That is, the derived feedback signals prevent the firing circuit 10 from generating a gating signal as long as there is a changing flux in transformer 2.

As shown in FIG. 1, the interlocking means associated with primary winding 1 includes a delay network, including resistance 28 and capacitance 29, connected from terminal 30 of the primary winding 1 and through current limiting resistance 31 and rectifier 32 to base electrode 17 of transistor 14. The voltage at terminal 26 of reset winding 6 is also coupled to base electrode 17 through current limiting resistance 33 and rectifier 34. A resistance 35 is provided between emitter electrode 36 and the junction 37 between resistance 33 and rectifier 34 which, in combination with resistance 33, determines the point in the negative half cycle during which interlock action terminates.

A resistance 39 is connected between the base and emitter electrodes of transistor 14 and provides a leakage current by-pass path therefor. A rectifier 40 is also connected between base 17 and emitter 36 of transistor 14 and prevents over-voltage of the base-to-emitter junction. A rectifier 41 shunts capacitance 29 and prevents charging thereof from the negative voltage of transformer 2. To assure a minimum holding current flow in controlled rectifier 5 after initiation of conduction therein, a resistance 42 is connected from the cathode 4 of controlled rectifier 5 to the common line 43. Rectifiers 32 and 34 are connected to block during the time their voltage sources are negative.

*Circuit operation*

A direct current voltage is supplied between the terminals 45 and 46 with the positive terminal thereof applied at terminal 45. Since anode 3 of controlled rectifier 5 is positive with respect to the cathode 4, controlled rectifier 5 will be rendered conducting when a gating signal from firing circuit 10 is applied to control electrode 8. When controlled rectifier 5 is rendered conducting the direct current supply voltage is applied to primary winding 1 and to the commutation circuit 20. As described hereinbefore, the characteristics of the commutation circuit 20 are such that controlled rectifier 5 will be rendered nonconducting a fixed time after initiation of conduction therein.

With controlled rectifier 5 conducting and a minimum holding current path established therefor through resistance 42, current flows through primary winding 1 of transformer 2 and to the commutation circuit 20. At a fixed time after initiation of conduction in controlled rectifier 5 the commutation circuit 20 is operative to apply a positive voltage on cathode 4 with respect to the anode 3 thereby rendering controlled rectifier 5 nonconductive.

The inductive nature of primary winding 1 causes it to reverse its voltage in an attempt to maintain current flow resulting in terminal 26 of reset winding 6 becoming positive with respect to its terminal 24. An electrical path is thus established from reset winding 6 through rectifier 27 to the direct current supply. This electrical path is operative to clamp the voltage of reset winding 6 to that of the direct current supply. Also during this reverse polarity of primary winding 1, when the terminal 25 thereof is positive with respect to its terminal 30, the capacitance 22 associated with the commutating circuit 20 becomes charged in the opposite direction with its terminal closest to ground potential becoming positive. The energy stored in the transformer, therefore, when controlled rectifier 5 was conducting is delivered to the load at a constant voltage during the period when controlled rectifier 5 is nonconducting.

When controlled rectifier 5 is rendered conductive, therefore, the terminal 30 of primary winding 1 is positive with respect to the terminal 25. This voltage is applied to the delay network made up of resistance 28 and capacitance 29 and from there through current limiting resistance 31 and rectifier device 32 to the control electrode 17 of transistor 14. This voltage forward biases transistor 14 and causes it to become conductive shorting out capacitance 15 and preventing semiconductor diode 11 from breaking down so that the relaxation oscillator is rendered inoperative. The voltage on terminal 30 of primary winding 1 remains positive until after controlled rectifier 5 has been turned off by operation of commutation circuit 20. Shortly thereafter, terminal 26 of reset winding 6 becomes positive as transformer 2 begins to reset. This voltage is applied through resistance 33 and across resistance 35 and through rectifier 34, again forward biasing transistor 14 to prevent operation of the firing circuit 10 during this negative half cycle.

Figure 2:
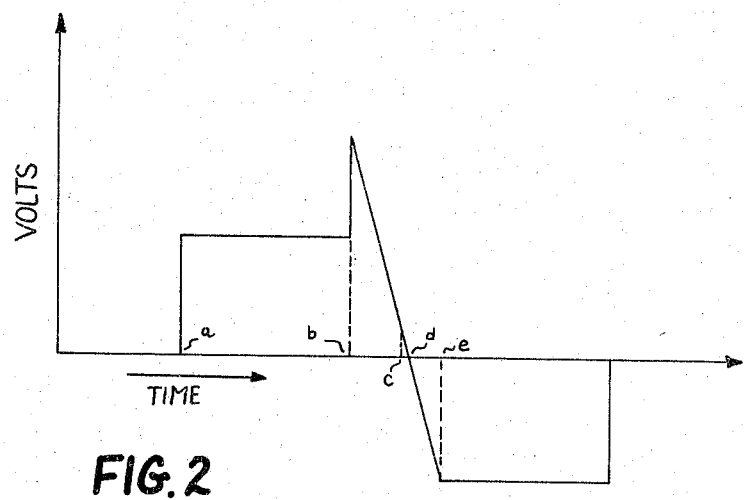
FIG. 2 is a voltage wave shape illustrating the transformer voltage during a cycle of operation.

The time delay provided by resistance 28, capacitance 29 and resistance 31 serves to maintain a forward bias on transistor 14 as the transformer voltage passes through zero. This may best be understood by reference to the transformer voltage wave shape shown in FIG. 2. As shown, the time from $a$ to $b$ is the conducting or "on" time of controlled rectifier 5 as determined by the particular parameters of the commutation circuit 20. The time from $b$ to $c$ is the period during which controlled rectifier 5 is reverse biased with the time from $c$ to $d$ being the recovery time thereof. The time from $d$ to $e$ is the time required to charge the capacitance 22 associated with the commutation circuit 20 in the opposite direction as transformer 2 begins to reset against the voltage of the direct current supply. The time delay provided by resistances 28 and 31 and capacitance 29, therefore, serves to maintain forward bias on transistor 14 during the period $c$ to $e$ in FIG. 2. Thus, the interlock means prevent the firing circuit 10 from operating to generate a gating signal for application to the control electrode of controlled rectifier 5 until the transformer 2 has been reset to a desired low residual flux level.

In FIG. 3 there is shown an alternative means of providing interlocking to insure that the firing circuit 10 is rendered inoperative as long as flux is changing in transformer 2. As shown, an additional secondary winding, or interlock winding, 50 is provided on power transformer 2. As long as voltage appears on power transformer 2, voltage will appear on interlock winding 50.

A suitable feedback signal is derived by means of the voltage dividing network, comprising series connected resistances 51, 52 and 53, connected across the output of interlock winding 50. Feedback signal conductor 54 is connected to the junction 55 between resistances 51 and 52. The junction 56 between resistances 52 and 53 is connected to the common point of reference potential, such as ground, and feedback signal conductor 57 is connected to the other end 58 of resistance 53. The feedback signals so derived are rectified by means of rectifier devices 60 and 61 and applied through current limiting resistance 62 to the base electrode 17 of transistor 14.

Presence of a feedback signal at the base electrode 17 is operative to render transistor 14 conductive which causes capacitor 15 to be shunted and prevent operation of firing circuit 10. As long as voltage appears on power transformer 2, voltage appears on interlock winding 50 causing a feedback signal to be applied to the base of transistor 14. Transistor 14 remains conductive and firing circuit 10 remains inoperative until the voltage across interlock 50 goes to zero at which time firing circuit 10 becomes operative.

For high power factor loads a lead network is provided shown as comprising a series resistance-capacitance combination of resistance 63 and capacitance 64 connected across resistance 51.

For more dependable operation in some applications it is desirable to also provide interlocking to prevent misoperation of the inverter circuit at low direct current supply voltages. For example, if the supply voltage rises abruptly when initially applied to the circuit, it is possible for the capacitance associated with the commutation circuit 20 to charge to some voltage below that necessary to provide a load current for a time sufficient to cause the controlled rectifier to be rendered nonconducting. To this end a line voltage interlocking arrangement may be provided to prevent the firing circuit generating a gating pulse if the line voltage is below a preselected level. In this way a step input voltage will always be applied to the commutation circuit which has sufficient amplitude to develop the required level of commutation voltage to assure turn off of the controlled rectifier.

In FIG. 4, therefore, there is illustrated a schematic circuit diagram of a complete inverter circuit similar to that of FIG. 1 but incorporating both a line voltage interlocking arrangement of the type just described as well as a load voltage interlocking arrangement similar to that shown in FIG. 3. In addition, the gating signal from firing circuit 10 is coupled to the control electrode 8 of controlled rectifier 5 through the isolating transformer 65 rather than directly as in FIG. 1.

As shown, capacitance 66, resistance 67 and breakdown diode 68 provide a low voltage power supply for the firing circuit 10. The line voltage interlock arrangement includes a transistor 70, a breakdown diode 71 connected through current limiting resistance 72 in the base circuit of transistor 70, and a voltage dividing network comprising series connected resistances 73 and 74. The breakdown diode 71 in the base circuit of transistor 70 together with the voltage dividing network provides a voltage reference operative to interlock the firing circuit 10 to a desired supply voltage. In operation the voltage divider network of resistances 73 and 74 is adjusted to provide that breakdown diode 71 will cease to conduct when the supply voltage drops below some predetermined level. For example, in a specific circuit arrangement for operation from a 75 volt supply the divider circuit may be adjusted to prevent the firing circuit 10 from generating a gating pulse if the supply voltage is below 60 volts.

The operation of the foregoing line voltage interlock is as follows: with the line voltage below a selected level, say for example 60 volts, the voltage at the junction 75 between resistances 73 and 74 is less than the reference value set by breakdown diode 71. Under this condition transistor 70 is biased off since its emitter electrode 76 is held above its base electrode voltage by the voltage drop across the diode 78. With transistor 70 nonconducting the current flow from the 75 volt supply line through resistance 79 and diode 80 forward biases transistor 14 rendering it conducting and thereby preventing operation of firing circuit 10 on the foregoing described manner. Diode 80 is provided to assure that the line voltage interlock does not interfere with the load voltage interlocking action.

When the line voltage exceeds 60 volts, the voltage at the junction 75 exceeds the reference value of breakdown diode 71 which causes transistor 70 to be forward biased and rendered conducting. With transistor 70 conducting, the current through resistance 79 is shunted from base electrode 17 causing transistor 14 to become nonconducting and thereby allowing firing circuit 10 to commence operation. The remaining operation of the inverter circuit is the same as that described in detail hereinbefore with respect to FIGS. 1 and 3.

FIG. 5 illustrates, in block diagram form, an arrangement whereby the inverter circuit of this invention may be employed to supply power to a direct current load and an alternating current load at the same time. Since the power supplied to the load can be represented as a series of square pulses whose average value is determined by the number of such pulses per unit time, the supply to the load can be varied by varying this pulse rate and consequently voltage regulation and current limit may be provided by varying the pulse rate of the firing circuit. This may be conveniently provided by deriving suitable feedback signals which may be applied to transistor 14 to control its conduction thereby controlling the amount of current shunted thereby and controlling the charging rate of capacitance 15. Thus the circuit of FIG. 5 illustrates the system with both voltage regulation and current limit for the direct current output.

As shown, an output secondary winding 90 is provided on transformer 2 to provide the alternating current output which may be suitably filtered in filter 92 to provide essentially a sine wave output to a load connected across the terminals 93 and 94.

Similarly, the direct current output is taken from secondary winding 7 suitably rectified by means of controlled rectifiers 96 and 97 which are controlled by voltage regulator 100 and firing circuit 101 to provide a desired regulated voltage. Current limit control is provided by operation of current limit means 102. The output is then suitably filtered through filter means 103 to obtain the desired regulated direct current output voltage at the terminals 105 and 106.

While only certain specific embodiments of our invention have been described, many changes and modifications may be made therein by those skilled in the art without departing from the invention. It is, therefore, to be understood that the appended claims are intended to cover all such changes and modifications as fall within the true spirit and scope of our invention.

What we claim as new and desire to secure by Letters Patent of the United States is:

1. A controlled rectifier system comprising: a controlled rectifier having an anode, a cathode and a control electrode; an isolating energy-storing transformer having a primary winding, a reset winding and at least one secondary winding; means connecting said primary winding and the anode-cathode elements of said controlled rectifier in series with a source of unidirectional voltage; first control circuit means providing a gating signal operative when applied to said control electrode to initiate conduction in said controlled rectifier to energize said primary winding; second control circuit means for rendering said controlled rectifier nonconductive a fixed time after initiation of conduction therein; means including said reset winding for providing an electrical path operative to clamp the transformer voltage to that of said unidirectional voltage source and allow said transformer to reset to a low residual flux level; and interlocking means between said transformer and said first control circuit means operative to prevent application of a gating signal to the control electrode of said controlled rectifier until the flux in said transformer has reset to a predetermined residual level.

2. A controlled rectifier system comprising: a controlled rectifier having an anode, a cathode and a control electrode; an isolating energy-storing transformer having a primary winding, a reset winding and at least one secondary output winding; means connecting said primary winding and the anode-cathode elements of said controlled rectifier in series with a source of unidirectional voltage; first control circuit means providing a gating signal operative when applied to said control electrode to initiate conduction in said controlled rectifier to energize said primary winding; second control circuit means including a capacitance for rendering said controlled rectifier nonconductive a fixed time after initiation of conduction therein; means including said reset winding for providing a unidirectional electrical path operative to clamp the transformer voltage to that of said unidirectional voltage source and allow said transformer to reset to a low residual flux level; and interlocking means connected between said transformer and said first control circuit means for sensing the voltage of said transformer and deriving a feedback signal operative to prevent application of a gating signal to the control electrode of said controlled rectifier until the flux in said transformer has reset to a predetermined residual level.

3. A controlled rectifier system comprising: a controlled rectifier having an anode, a cathode, and a control electrode; an isolating energy-storing transformer having a primary winding, a reset winding, and at least first and second secondary windings; means connecting the anode-cathode elements of said controlled rectifier in series with said primary winding and a direct current voltage supply; means for applying a gating signal to said control electrode to initiate conduction in said controlled rectifier; means for rendering said controlled rectifier nonconducting a fixed time after initiation of conduction therein; means including said reset winding for providing a unidirectional electrical path operative to clamp the voltage of said transformer to that of said direct current voltage supply and allow said transformer to reset to a low residual flux level; means for deriving a control signal from the voltage induced in said first secondary winding; means for utilizing the control signal so derived to prevent application of a gating signal to said control electrode; and means for taking an output from said secondary winding.

4. A controlled rectifier system comprising: a controlled rectifier having an anode, a cathode, and a control electrode; an isolating energy-storing transformer having a primary winding, a reset winding, and at least one secondary output winding adapted to supply power to a load; means connecting said primary winding and the anode-cathode elements of said controlled rectifier in series with a unidirectional voltage supply; firing circuit means for generating a gating signal operative when applied to said control electrode to initiate conduction in said controlled rectifier; commutation circuit means including a capacitance for rendering said controlled rectifier nonconducting a fixed time after initiation of conduction therein; means including a unidirectionally conducting device connecting one end of said reset winding to the anode terminal of said controlled rectifier and the other end thereof in series with said primary winding to establish a unidirectional electrical path operative to clamp the voltage of said transformer to that of said unidirectional voltage supply and allow the energy stored in said transformer to reset the flux thereof to a predetermined low residual level; means including a time delay network for deriving a first feedback signal from the voltage of said primary winding; and means for deriving a second feedback signal from the voltage of said reset winding, said first and second feedback signals being operative when applied to said firing circuit means to render said firing circuit means inoperative until the flux in said transformer has reset to a predetermined low residual level.

5. An electrical system comprising: an isolating energy storing transformer having a primary winding, a reset winding and a secondary winding; a controlled rectifier having an anode, a cathode and a control electrode; means connecting said primary winding and the anode-cathode elements of said controlled rectifier in series with a unidirectional voltage source; means for applying a gating signal to the control electrode of said controlled rectifier to initiate conduction therein; means for terminating conduction in said controlled rectifier a predetermined time after the initiation of said conduction therein; an electrical path including said reset winding, a unidirectionally conducting device and a unidirectional voltage source operative upon termination of conduction in said controlled rectifier to reset the flux in said transformer to a predetermined level; interlocking means operative to prevent the application of said gating signal to the control electrode of said controlled rectifier until the flux in said transformer has been reset to said predetermined level; and output means including said secondary winding.

6. A controlled rectifier system comprising: a controlled rectifier having an anode, a cathode and a control electrode; an isolating energy-storing transformer having a primary winding, a reset winding and at least one secondary output winding; means connecting the anode-cathode elements of said controlled rectifier in series with a unidirectional voltage supply; firing circuit means for generating a gating signal operative to initiate conduction in said controlled rectifier; means for coupling said gating signal to the control electrode of said controlled rectifier; commutation circuit means operative to render said controlled rectifier nonconducting a fixed time after initiation of conduction therein; means including said reset winding providing an electrical path operative to clamp the transformer voltage to that of said unidirectional voltage supply and allow said transformer to rest to a low residual flux level; line voltage interlock means connected between the unidirectional voltage source and said firing circuit means operative to render said firing circuit inoperative at voltages below a predetermined level; load voltage interlocking means including said reset winding connected between said transformer and said firing circuit means operative to render said firing circuit means inoperative until the flux in said transformer has reset to a predetermined residual level; and means for extracting a desired output from said secondary output windings.

References Cited

UNITED STATES PATENTS

| | | | |
|---|---|---|---|
| 3,120,634 | 2/1964 | Genuit | 321—45 |
| 3,133,241 | 5/1964 | White | 321—45 |
| 3,164,767 | 1/1965 | Morgan | 321—45 X |
| 3,197,691 | 7/1965 | Gilbert | 321—44 X |

JOHN F. COUCH, *Primary Examiner.*

W. M. SHOOP, *Assistant Examiner.*

UNITED STATES PATENT OFFICE
CERTIFICATE OF CORRECTION

Patent No. 3,324,381                           June 6, 1967

Donald D. Bock et al.

It is hereby certified that error appears in the above numbered patent requiring correction and that the said Letters Patent should read as corrected below.

Column 8, line 9, before "secondary" insert --second --; line 75, for "rest" read -- reset --.

Signed and sealed this 26th day of December 1967.

(SEAL)
Attest:

Edward M. Fletcher, Jr.                     EDWARD J. BRENNER

Attesting Officer                            Commissioner of Patents